United States Patent
Spiess

(10) Patent No.: US 7,930,936 B2
(45) Date of Patent: *Apr. 26, 2011

(54) TAG USED FOR MONITORING THE TIRE PRESSURE

(75) Inventor: Bernhard Georg Spiess, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/368,926

(22) Filed: Feb. 10, 2009

(65) Prior Publication Data

US 2009/0145215 A1    Jun. 11, 2009

Related U.S. Application Data

(63) Continuation of application No. 11/587,591, filed as application No. PCT/IB2005/051301 on Apr. 21, 2005, now Pat. No. 7,497,114.

(30) Foreign Application Priority Data

Apr. 29, 2004    (EP) .................................... 04101842

(51) Int. Cl.
B60C 23/02    (2006.01)
(52) U.S. Cl. .................................................... 73/146.2
(58) Field of Classification Search .................. None
See application file for complete search history.

(56) References Cited

U.S. PATENT DOCUMENTS

| | | | |
|---|---|---|---|
| 4,934,184 A | 6/1990 | Tsuji | |
| 6,112,587 A | 9/2000 | Oldenettel | |
| 6,556,934 B2 | 4/2003 | Higashide | |
| 6,894,600 B2 * | 5/2005 | Phelan | 340/10.34 |
| 6,945,103 B1 * | 9/2005 | Lee et al. | 73/146.5 |
| 7,034,672 B2 * | 4/2006 | Dinello et al. | 340/447 |
| 7,212,104 B2 * | 5/2007 | Haswell et | 340/442 |
| 7,299,694 B2 | 11/2007 | Byrne | |
| 7,305,874 B2 * | 12/2007 | Ullmann | 73/146.5 |
| 7,337,077 B2 | 2/2008 | Sugioka | |
| 7,343,789 B2 * | 3/2008 | Fujisawa et al. | 73/146 |
| 7,370,523 B2 | 5/2008 | Kitazaki | |
| 2003/0079536 A1 | 5/2003 | Fischer | |
| 2003/0221481 A1 | 12/2003 | Von Wendorff | |
| 2003/0227380 A1 | 12/2003 | Piech et al. | |
| 2003/0233872 A1 | 12/2003 | Boulot | |

FOREIGN PATENT DOCUMENTS

| | | |
|---|---|---|
| CN | 1476389 A | 2/2004 |
| CN | 1479678 A | 3/2004 |
| GB | 2 344 232 A | 5/2000 |

OTHER PUBLICATIONS

International Preliminary Report on Patentability for international patent apln. PCT/IB2005/051301 (Nov. 1, 2006).

* cited by examiner

Primary Examiner — Lisa M Caputo
Assistant Examiner — Jermaine Jenkins

(57) ABSTRACT

A measuring method for measuring physical variables comprises the selection of a working point (AP) lying within a total measurement range (G) of a physical variable (M) to measured, the detection of a measured value (M(t1)) of the physical variable at a first measuring time (t1), the determination of a displacement value (V(t1)) as the result of a subtraction of the measures value (M(t1)) measured at the first measuring time from the working point (AP), the formation of change values (C(t2), C(t3) . . . C(tx)) of the physical variable (M) by acquiring subsequent measured values (M(t2), M(t3) . . . M(tx)) of the physical variable at subsequent measuring times (t2, t3 . . . tx) and addition of the displacement value (V(t1)) to the subsequent measured values.

14 Claims, 2 Drawing Sheets

TAG USED FOR MONITORING THE TIRE PRESSURE

FIELD OF THE INVENTION

The invention relates to a measuring method for measuring physical variables.

The invention relates furthermore to a measuring system having a sensor for detecting a physical variable and for emitting measured values of the detected physical variable, and having an analog-digital converter for detecting the measured values emitted by the sensor.

The invention relates furthermore to a data carrier.

BACKGROUND OF THE INVENTION

In the case of digital measuring methods and measuring systems, it is known that electric power consumption and the time required for measuring are dependent on the accuracy of the measurement, the product of electric power consumption and measuring time being relatively constant for a specific accuracy of measurement.

The use of such measuring methods and measuring systems presents problems in monitoring applications where relatively little energy is available, yet accurate measurements of a specific physical variable are to be made at regular intervals, as, for example, in the case of tire-pressure monitoring systems on motor vehicles.

OBJECT AND SUMMARY OF THE INVENTION

It is an object of the invention to produce a measuring method of the kind specified in the first paragraph, a measuring system of the kind specified in the second paragraph and a data carrier of the kind specified in the third paragraph, wherein the above-mentioned disadvantages are avoided.

To achieve the above-mentioned object, in a measuring method in accordance with the invention, inventive features are provided so that a method in accordance with the invention can be characterized in the manner specified hereinafter, namely:

Measuring method for measuring physical variables, comprising:

the selection of a working point lying within a total measurement range of a physical variable to be measured, the detection of a measured value of the physical variable at a first measuring time, the determination of a displacement value as the result of a subtraction of the measured value measured at the first measuring time from the working point, the formation of change values of the physical variable by acquiring subsequent measured values of the physical variable at subsequent measuring times and addition of the displacement value to the subsequent measured values.

To achieve the above-mentioned object, in a measuring system in accordance with the invention inventive features are provided, so that a system in accordance with the invention can be characterized in the manner specified hereinafter, namely:

Measuring system having a sensor for detecting a physical variable and for emitting measured values of the detected physical variable, having an analog-digital converter for detecting the measured values emitted by the sensor and for converting the measurement signals into digital measured values, having calculation means for determining a displacement value as the difference of a measured value measured at a first measuring time from a selected working point lying within a total measurement range of the physical variable, and having addition means, which are constructed to add the displacement value to the measured values supplied to the analog-digital converter, so that as output values the analog-digital converter supplies change values of the physical variable that are formed from the acquired measured values plus the displacement value.

To achieve the above-mentioned object, in the case of such a data carrier a measuring system in accordance with the invention is provided, the data carrier comprising transmitting means for wireless transmission of the change values and/or of measured values of the measured physical variable determined by the measuring system.

The features according to the invention enable monitoring of physical variables to be performed with substantially lower electric power consumption or shorter measuring time than according to the prior art, and the invention is therefore excellently suited for use in monitoring systems in which little electrical supply energy is available. The invention is especially suitable for use in those monitoring systems in which a physical variable that changes slowly with time is to be permanently monitored, such as, for example, the tire pressure in a motor vehicle tire. Furthermore, in many known monitoring systems, such as, for example, tire pressure-monitoring systems, the physical variable is indeed measured at regular intervals, but what is really of interest after a first recording of a measured value is the change in this physical variable over time, and not its absolute value. Through the invention, the physical variable value to be measured is displaced into a working range lying around a selected working point, the working range amounting to only a fraction of the total measurement range. If therefore, for example, the working range amounts to one quarter of the total measurement range, then for the same accuracy of measurement the measuring time can shortened to up to a quarter of the original measuring time or a corresponding reduction in the electric power consumption can be achieved. The invention can be very easily integrated into contactless data carriers and thus offers wide-ranging opportunities for application.

It can be mentioned that a method and a system for monitoring tire pressure are known from the document US2003/0079536 A1; here, in addition to the actual tire pressure, a parameter that influences the tire pressure is also measured, wherein on the basis of this parameter an optimum tire pressure is calculated, is compared with the tire pressure actually measured and, when the actual tire pressure differs from the optimum tire pressure by more than a predetermined value, a variation signal is issued. In contrast with the present invention, with this known tire pressure-monitoring method and system it is always the actual tire pressure, that is to say, the complete measured value, that is measured and a variation value that is calculated. No change value is measured.

The advantage obtained in accordance with the measures of claim 2 is that, when the change value exceeds the selected working range, a simple, power-saving and time-saving adjustment of the displacement value can be performed, in order to bring the subsequent change values into the working range again. The working range can therefore be selected to be small, which in turn contributes to saving of time and energy.

The advantage obtained in accordance with the measures of claim 3 is that, when the change value exceeds the selected working range, an accurate re-calculation of the displacement value can be performed.

The advantage obtained in accordance with the features of claim 4 is that the resolution for the detection of measured values of the physical variable and the resolution for the detection of change values can be set independently of one another, as required, for example, a higher resolution being set for the detection of change values in order to monitor the change in the physical variable as exactly as possible.

The advantage obtained in accordance with the measures of claim 6 and 7 is a hard-wired implementation combined with high accuracy and minimum expenditure on components.

The advantage obtained in accordance with the measures of claim 8 is that the resolution of the analog-digital converter and hence its conversion time and its energy consumption are adaptable to the particular requirements of the application. In particular, different resolutions can thus be set in a simple manner, depending on whether the analog-digital converter is being operated to measure the physical variable in the total measurement range or to detect a change value of the physical variable in the working range.

The advantage obtained in accordance with the measures of claim 9 is that the resolution and the conversion time of sigma-delta converters can be adjusted and their electric power consumption is low.

The advantage obtained in accordance with the measures of claim 10 is that the measuring system according to the invention can be used as a tire pressure-monitoring system that is superior to conventional tire-pressure monitors in respect of electric power consumption and accuracy.

The advantage obtained in accordance with the measures of claim 12 is that the data carrier is operable in a frequency band, namely between 300 and 900 MHz, in which many monitoring systems work, so that the data carrier according to the invention can be integrated into these monitoring systems.

The advantage obtained in accordance with the measures of claim 13 is that the data carrier does not require its own energy supply in the form of a battery or rechargeable battery, rather is supplied externally via the received electromagnetic field, so that it is maintenance-free and can be installed in a completely closed housing.

The advantage obtained in accordance with the measures of claim 14 is that the data carrier can be supplied with electrical energy from the received electromagnetic field, but—unlike the case with passive data carriers—even if the data carrier is removed from the range of the electromagnetic field this energy is still available owing to the temporary storage thereof.

These and other aspects of the invention are apparent from and will be elucidated, by way of non-limitative example, with reference to the embodiments described hereinafter.

DESCRIPTION OF EMBODIMENTS

Figure 1:
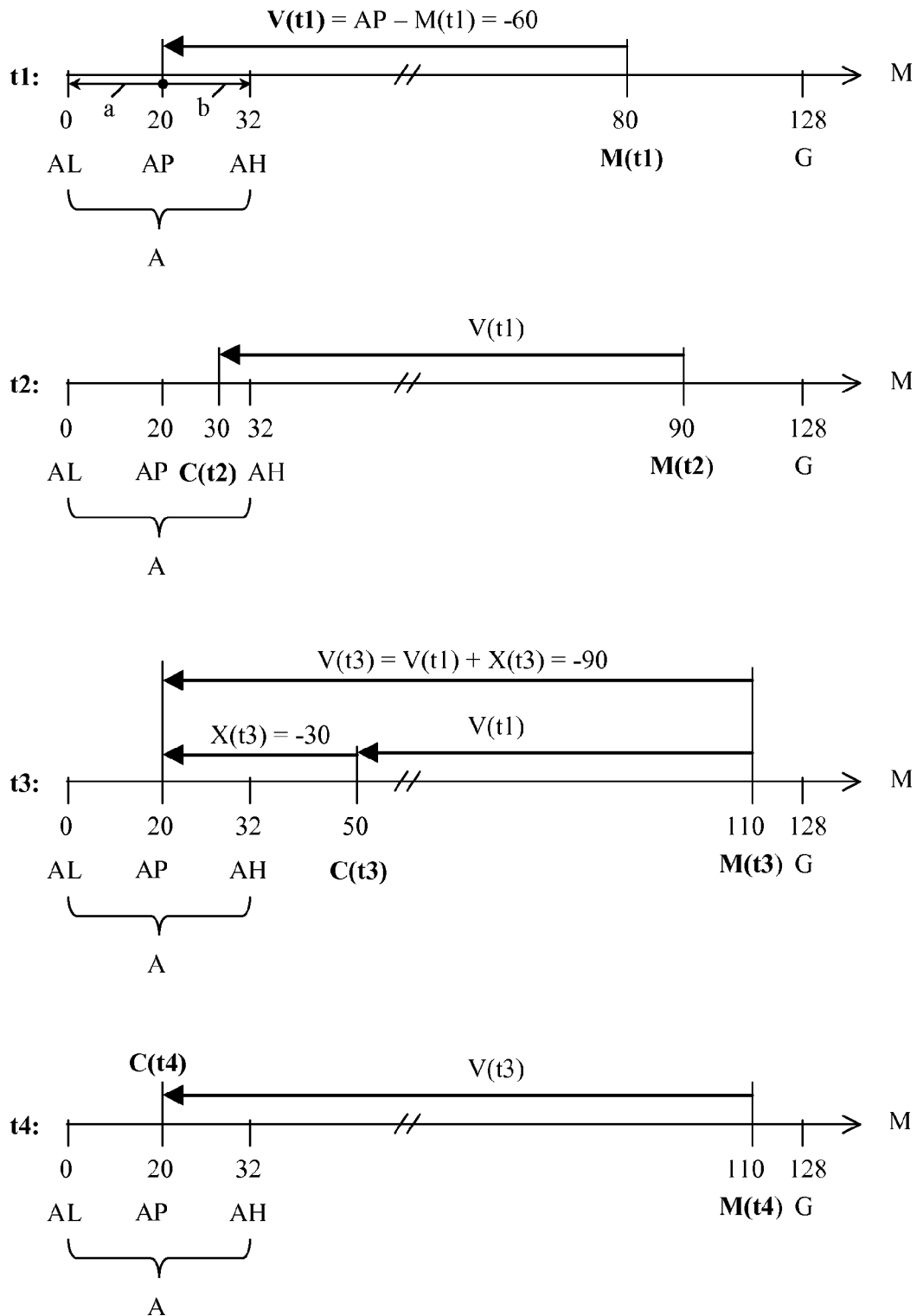
FIG. 1 shows a time-based diagram to illustrate the measuring method according to the invention.

FIG. 1 shows a time-based diagram, by means of which the measuring method according to the invention is explained below. The time-based diagram shows the respective value of a physical variable M at different measuring times t1 to t4. The total measurement range G, within which all values of the physical variable M lie, shall be assumed in this exemplary embodiment to be 128. The total measurement range G can depend on the measurement range of a sensor for detecting the physical variable or on a measurement range of an analog-digital converter connected downstream of the sensor. The first line in the time-based diagram represents the first measuring time t1, at which a measured value M(t1) of the physical variable M of 80 occurs. It should be mentioned that all numerical data serve merely for explanation of the measuring method according to the invention and are random. It should furthermore be mentioned that for reasons of clarity the measured values over the measurement range are not shown true to scale. Furthermore, within the total measurement range G a working point AP and a working range A is selected, the working range A begin defined by a lower limit value AL and by an upper limit value AH. The lower limit value AL is obtained from the subtraction of a lower working range width a (here: a=20) from the working point AP. The upper limit value AH is obtained by addition of an upper working range width b (here: b=12) to the working point AP. It should be mentioned that the lower and the upper working range widths a, b are selected to be the same width in most cases of application. Likewise, the working range widths a, b can be dynamically matched. The working range A lies between 0 and 32 and therefore amounts to one quarter of the total measurement range G. In accordance with the measuring method of the invention, the measured value M(t1) acquired at the first measuring time t1 is used to form a displacement value V(t1), by subtracting the measured value M(t1) from the working point AP:

$$V(t1)=AP-M(t1)=20-8=-60.$$

This displacement value V(t1) is used for the subsequent measurements for determining a change value. Thus, the second line in the time dependency diagram of FIG. 1 shows a second measuring time t2, at which a measured value M(t2) of the physical variable M of 90 is acquired. The change value C(t2) can be calculated according to the invention by adding the displacement value V(t1) acquired at the first measuring time t1 to the measured value M(t2), that is:

$$C(t2)=M(t2)+V(t1)=90+(-60)=30.$$

The acquired change value C(t2) lies in the working range A, that is, within the limit values AL and AH. The advantage of the measuring method according to the invention is that, after the first measurement, at which a measured value that can lie anywhere within the total measurement range G is acquired, only the change values have to be accurately detected, but these lie in a substantially reduced measurement range compared with the total measurement range G because of displacement of the respective measured value into the working range, in the present example within the lowermost quarter of the total measurement range. An analog-digital converter that samples a measurement range requires so much the less electric power and/or measuring time the smaller is the measurement range it has to sample. As a rule of thumb, one can assume that the product of electric power consumption and measuring time for a specific value to be sampled is constant and increases linearly with the magnitude of the measured values. If, as in the present case, the values to be sampled by an analog-digital converter, that is, the change values, lie only in the lowest quarter of the total measurement range, then one can anticipate an average reduction in electric power consumption to a quarter.

The case where the measured values change so significantly that the change values C(tx) displaced by the displacement value V(t1) lie outside the preferred working range A requires special treatment. This case is shown in the third line of the time-based diagram of FIG. 1, which shows the measuring time t3. The measured value M(t3) appearing at measuring time t3 is 110. If the displacement value V(t1) of −60 is added thereto, a change value C(t3)=50 is obtained. This value lies above the upper limit value AH of 32 and hence outside the working range A. In other words, the change value C(t3) exceeds the working point AP by more than the upper working range width b. So that during subsequent measurements the change value again lies in the working range, the displacement value must be corrected. According to the invention, two approaches are provided for this. Firstly, the measured value M(t3), which provided the basis for the calculation of the change value C(t3), or alternatively a subsequent measured value (Mtx), can be subtracted from the working point AP and the difference value resulting from this calculation can be used as new displacement value V(t3) respectively V(tx) for subsequent calculations of change values. This procedure corresponds to that carried out at the time t1 in the case of the first measured value acquisition. An alternative approach for determining a corrected displacement value V comprises adding a variation value X to the previous displacement value. The variation value X should be selected to be at least sufficiently large that subsequent change values C will lie with great probability within the working range A again, wherein it should be mentioned that the measuring method according to the invention is preferably used for monitoring slowly changing physical variables, so that from the knowledge of the instantaneous measured values or the measured value trend in the past, a good estimation of the tendency of the subsequent measured values is possible, so that again by simple mathematical or statistical methods a suitable variation value can be determined. The variation value X can also be changed in several steps in order to bring the subsequent change values C into the working range again without provoking sudden changes in the change values C. In a preferred embodiment of this approach, as illustrated in the time dependency diagram of FIG. 1 at the time t3, a variation value X(t3) is calculated by subtracting the change value C(t3) lying outside the working range A from the working point AP, that is:

$$X(t3)=AP-C(t3)=20-50=-30$$

and the variation value X(t3) is added to the previous displacement value V(t1) producing the new displacement value V(t3):

$$V(t3)=V(t1)+X(t3)=-60+(-30)=-90.$$

The new displacement value V(t3) is used to determine the subsequent change values, as illustrated in the time-based diagram at the measuring time t4. It is apparent that owing to the displacement value V(t3) now applied, a measured value M(t4) of 110, unchanged compared with the measuring time t3, leads to a change value C(t4) of 20 that lies within the working range A.

Figure 2:
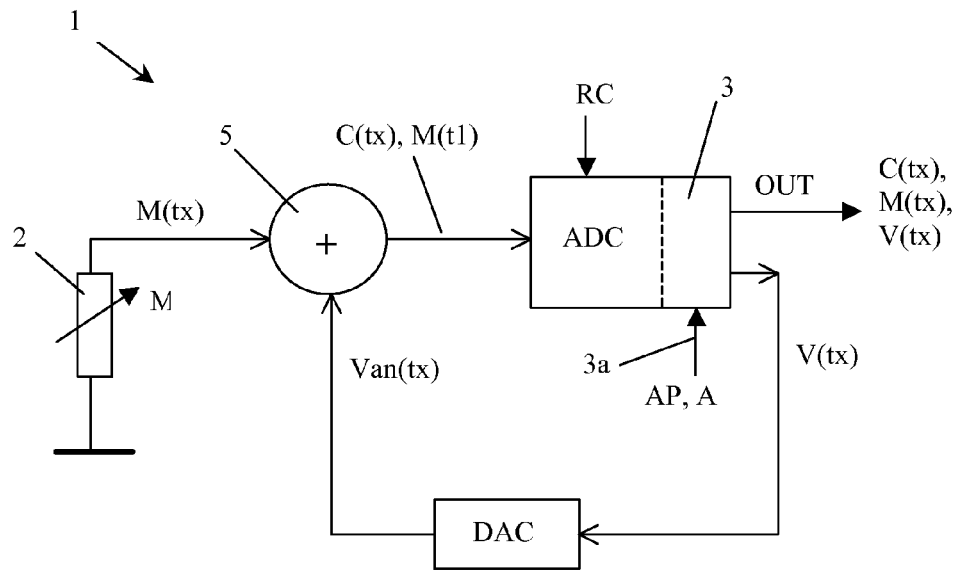
FIG. 2 is a block diagram of a first embodiment of a measuring system according to the invention.

FIG. 2 illustrates a block diagram of a first embodiment of a measuring system 1 according to the invention, which is designed to execute the measuring method according to the invention. The measuring system 1 comprises a sensor 2, which supplies analog measured values (M(tx) of the sensed physical variable M as its output signal. The measured values M(tx) emitted by the sensor 2 are supplied to an input of an analog-digital converter ADC, which performs a digitization of the received signals and supplies the digitized values to calculation means 3, which are integrated in the analog-digital converter ADC. Furthermore, the measuring system according to the invention is provided with addition means, which comprise a summation circuit 5 connected between the sensor 2 and the analog-digital converter ADC as well as a digital-analog converter DAC. The measured values M(tx) of the sensor 2 are fed to one input of the summation circuit 5 and the output voltage Van(tx) supplied by the digital-analog converter DAC is fed to another input and the signals present at the two inputs are added and supplied from an output of the summation circuit 5 to the input of the analog-digital converter ADC. Furthermore, the calculation means has an input 3a for adjusting a working point AP and a working range A. The mode of operation of the measuring system 1 according to the invention is as follows: at a first measuring time t1, for example on start-up of the measuring system or at regular intervals, the output of the digital-analog converter DAC is set to zero, so that the measured value M(t1) present at the summation circuit 5 is passed on unchanged to the analog-digital converter ADC and is digitized in the analog-digital converter ADC. From the digitized measured value M(t1) the calculation means 3 calculate a displacement value V(t1), by subtracting the measured value M(t1) from the working point AP predetermined via the input 3a and storing the result of this subtraction as displacement value V(t1) and at the same time supplying it as input signal to the input of the digital-analog converter DAC, which converts the displacement value V(t1) into an analog electrical voltage Van(t1) and feeds it to an input of the summation circuit 5. The summation circuit 5 now supplies a change signal C(tx) to the analog-digital converter ADC, which signal corresponds to the sum of the measured value M(tx) and the analog displacement value Van(t1). The digitized change signal C(tx) is output by the analog-digital converter ADC at the output OUT for further use by a monitoring device, not illustrated. It should be mentioned that, in addition to the change signal C(tx), the measured value M(t1) on which the determination of the displacement value (Vt1) is based, as well as the calculated displacement value V(t1), can also be output via the output OUT, in order to allow the monitoring device, not illustrated, to evaluate the trend of the physical variable comprehensively. In an alternative construction of the measuring system 1, instead of the change signal C(tx) at the output OUT, a measured value reconstructed by the calculation means 3 could be output, this value being calculated from the change value C(tx) less the displacement value V(t1).

As long as the change values C(tx) move within the working range A, the displacement value V(t1) is retained. If the change values C(tx) lie outside the working range A, a recalculation of the displacement value is performed according to the measuring method of the invention, as was explained above with reference to FIG. 1. Since, after the initial determination or, if applicable, re-adjustment of the displacement value, the summation circuit 5 sends to the analog-digital converter ADC in the measuring system 1 according to the invention only input signals that lie in a small range of the total measurement range, the analog-digital converter ADC is able to carry out digitization of the supplied signals with reduced power consumption and reduced conversion time. In a preferred embodiment, the analog-digital converter ADC is in the form of a sigma-delta converter and has an input for changing the resolution and the conversion time, so that both the resolution of the total measurement range and that of the selected working range are adjustable.

The measuring system 1 according to the invention is excellently suited for use in monitoring systems in which a relatively slowly changing physical variable must be monitored or in which the change in a physical variable rather than its absolute value is important in the monitoring. The measuring system 1 according to the invention is of particular advantage in all those applications in which little electrical energy is available for supply of the measuring system 1. Such applications comprise, for example, tire pressure-monitoring systems, where the measuring system is built directly into a tire or a wheel rim and a pressure sensor is used as sensor 2.

Figure 3:
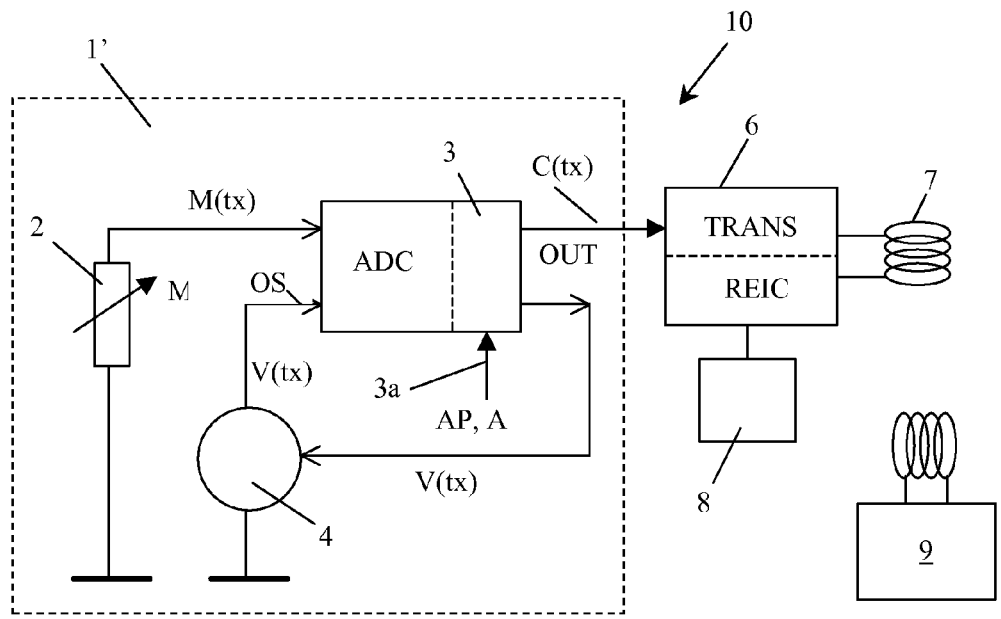
FIG. 3 is a block diagram of a second embodiment of a measuring system according to the invention that is integrated in a contactlessly readable data carrier.

A block diagram of a second embodiment of a measuring system 1' according to the invention that is integrated in a contactlessly readable data carrier 10 is shown in FIG. 3. The measuring system 1' comprises a sensor 2, for example, a pressure or temperature sensor, which senses a physical variable M and sends measured values M(tx) to an analog-digital converter ADC, which digitizes the received measured values and sends the digitized values to calculation means 3, which are integrated in the analog-digital converter ADC. The calculation means 3 have an input 3a for adjusting a working point AP and a working range A. From the received measured values M(tx) and the working point AP, the calculation means 3 calculate a displacement value V(tx) in accordance with the measuring method of the invention. This displacement value V(tx) is supplied to a controllable voltage source 4, which in response to the displacement value produces a d.c. voltage that is supplied to an offset voltage input OS of the analog-digital converter ADC and displaces the quantization range of the analog-digital converter ADC by an amount corresponding to the displacement value V(tx), so that at its output OUT the analog-digital converter ADC delivers change values C(tx), which correspond to the addition of the measured value M(tx) and the displacement value V(tx).

The change values C(tx) are supplied to transmitting means TRANS of an air interface 6, which comprises a coupling element 7, such as an antenna or coil, for transmitting and receiving electromagnetic signals. The transmitting means TRANS transmit the change values C(tx) in the form of electromagnetic signals via the coupling element to a reader station 9, which evaluates the change values C(tx). In a preferred embodiment, the transmitting means TRANS operate in a UHF frequency range between 300 and 900 MHz. The frequency range of the transmitting means is not specifically restricted, however. Other frequency ranges in which the transmitting means are operable lie, for example, at 125 kHz, 13.56 MHz or 2.4 GHz. The data carrier 10 and the measuring system 1' formed therein can be battery-powered. Here, preference is given to the use of a secondary cell or a rechargeable energy storage mechanism 8 as battery, which can be charged via energy from an electromagnetic field, by constructing in the air interface 6 receiving means REIC that receive an electromagnetic field built up by the reader station, extracting electrical energy from this electromagnetic field and feeding it to the energy storage mechanism 8 for charging and temporary storage, so that it is available for power supply to all assemblies of the data carrier 10. Alternatively, the data carrier 10 can be in the form of a passive data carrier.

The invention claimed is:

1. A measuring method for measuring physical variables, comprising:
   the selection of a working point within a total measurement range of a physical variable to be measured,
   the detection of a measured value of the physical variable at a first measuring time,
   the determination of a displacement value as the result of a subtraction of the measured value from the working point,
   the formation of change values of the physical variable by acquiring at least one subsequent measured value of the physical variable during at least one subsequent measuring time and addition of the displacement value to the at least one subsequent measured value.

2. A measuring method as claimed in claim 1, wherein, if the change value exceeds the working point by more than a predetermined upper working range width or falls below the working point by more than a predetermined lower working range width, a new displacement value is determined by adding a variation value to the previous displacement value.

3. A measuring method as claimed in claim 1, wherein, if the change value exceeds the working point by more than a predetermined upper working range width or falls below the working point by more than a predetermined lower working range width, a new displacement value is determined as the result of a subtraction of the measured value, measured at this measuring time or at a subsequent measuring time from the working point.

4. A measuring method as claimed in claim 1, wherein for the total measurement range of the physical variable to be measured an overall resolution of an analog-digital converter sampling the measured values is set, by dividing the total measurement range into a total number of quantization ranges, and a working range resolution of the digital-analog converter of a working range containing the working point is set, by subdividing the working range into a number of quantization ranges.

5. A measuring system having a sensor for detecting a physical variable and for emitting measured values of the detected physical variable, having an analog-digital converter for detecting the measured values emitted by the sensor and for converting them into digital measured values, wherein said system further comprises: a calculator for determining a displacement value as the difference of a measured value measured at a first measuring time from a selected working point lying within a total measurement range of the physical variable, and a processor for adding the displacement value to the measured values supplied to the analog-digital converter, so that as output values the analog-digital converter supplies change values of the physical variable.

6. A measuring system as claimed in claim 5, wherein the processor includes a digital-analog converter, controlled by the calculator and of which the output signal represents the displacement value, and a summation circuit capable of receiving the output signal of the digital-analog converter.

7. A measuring system as claimed in claim 5, wherein the analog-digital converter has an offset voltage input for adjusting a displacement of a zero point of the digitization range of the analog-digital converter and the processor further comprises a controllable voltage source connected to the offset voltage input, which voltage source is adjustable by the calculator to a voltage representing the displacement value.

8. A measuring system as claimed in claim 5, wherein the analog-digital converter has a control input for setting the resolution.

9. A measuring system as claimed in claim 5, wherein the analog-digital converter is in the form of a sigma-delta converter.

10. A measuring system as claimed in claim 5, wherein the sensor is in the form of a pressure sensor and the measuring system is in the form of a tire pressure-measuring system.

11. A data carrier for measuring physical variables, having a measuring system as claimed in claim 5, wherein the data carrier comprises a transmitter for wireless transmission of the change values and/or of measured values of the measured physical variable determined by the measuring system.

12. A data carrier as claimed in claim 11, wherein the transmitter emits electromagnetic signals in the UHF band.

13. A data carrier as claimed in claim 11, wherein the data carrier comprises a receiver for receiving an electromagnetic field and for extracting electrical energy from the electromagnetic field for supplying the data carrier with electrical energy.

14. A data carrier as claimed in claim 13, wherein a chargeable battery in the form of a secondary cell, or a rechargeable energy storage mechanism, is provided, which are chargeable using energy from an electromagnetic field that is receivable by the receiver.

* * * * *